Aug. 12, 1969　　C. D. EICHELBERGER　　3,461,348
MOUNTING MEANS FOR THE STATIONARY STUDS OF DRAW-OUT
METAL CLAD SWITCHGEAR
Filed Oct. 21, 1968　　3 Sheets-Sheet 1

INVENTOR:
CHARLES D. EICHELBERGER,
BY William Freedman
ATTORNEY

Aug. 12, 1969        C. D. EICHELBERGER        3,461,348
   MOUNTING MEANS FOR THE STATIONARY STUDS OF DRAW-OUT
                    METAL CLAD SWITCHGEAR
Filed Oct. 21, 1968                           3 Sheets-Sheet 3

INVENTOR:
CHARLES D. EICHELBERGER,
BY  William Freedman
         ATTORNEY

United States Patent Office 3,461,348
Patented Aug. 12, 1969

3,461,348
MOUNTING MEANS FOR THE STATIONARY STUDS OF DRAW-OUT METAL CLAD SWITCHGEAR
Charles D. Eichelberger, Ridley Park, Pa., assignor to General Electric Company, a corporation of New York
Filed Oct. 21, 1968, Ser. No. 769,291
Int. Cl. H02b *11/06, 1/20*
U.S. Cl. 317—103                    2 Claims

ABSTRACT OF THE DISCLOSURE

A switchgear unit comprises a metal cabinet having a vertical metal partition extending thereacross and a bus bar behind the partition having a stud projecting therefrom through an opening in the partition. A tubular insulator is positioned around the stud in the opening and is detachably secured to the stud. A first insulating plate is detachably mounted on the front side of the partition and has an opening receiving the tubular insulator. A second insulating plate is positioned against the front side of the first plate and has an opening also receiving the tubular insulator. The two plates are clamped together about an outer flange on the tubular insulator to hold the tubular insulator in a fixed position within the openings in the insulating plates.

---

This invention relates to mounting means for the stationary studs of draw-out metal clad switchgear.

The general type of switchgear that I am concerned with is shown and claimed in U.S. Patent 3,397,293, Darrow et al., assigned to the assignee of the present invention. This switchgear comprises a metal cabinet having a vertical partition extending thereacross and a plurality of vertically spaced bus bars extending horizontally across the cabinet behind the partition. Studs connected to the bus bars project through spaced openings in the partition to points in front of the partition. For supporting each stud, a tubular insulator located within the associated opening in the partition is provided about each stud and is detachably connected thereto.

An object of the present invention is to mount each of these tubular insulators on the partition in such a manner that the insulator and all of the mounting structure therefor can be easily removed without requiring access to the rear of the partition should it be necessary to renew any of these parts.

Another object is to allow for such removal of the insulator and its mounting without altering the position of the stud or bus, thus maintaining preadjusted alignments of these latter parts.

In carrying out the invention in one form, I provide a metal cabinet comprising a vertical metal partition extending thereacross. Behind the partition there is a bus bar having a horizontally-extending stud projecting therefrom through an opening in the partition to a point in front of the partition. Positioned in said opening is a tubular insulator that surrounds the stud and is detachably secured thereto. The tubular insulator has a radially-outwardly projecting flange on this outer periphery. A first plate of insulating material is detachably mounted on the front side of the partition and has on opening therein receiving said tubular insulator. A second plate of insulating material is positioned against the front side of the first plate and also has an opening therein receiving said tubular insulator. The two plates have aligned recesses surrounding the opening therein and cooperating to form a seat of generally U-shaped cross-section for receiving the flange on the tubular insulator. Means are provided for clamping these two plates together, thus holding said flange between said aligned recessed portions.

For a better understanding of the invention, reference may be had to the following description taken in conjunction with the accompanying drawings, wherein.

Figure 1:
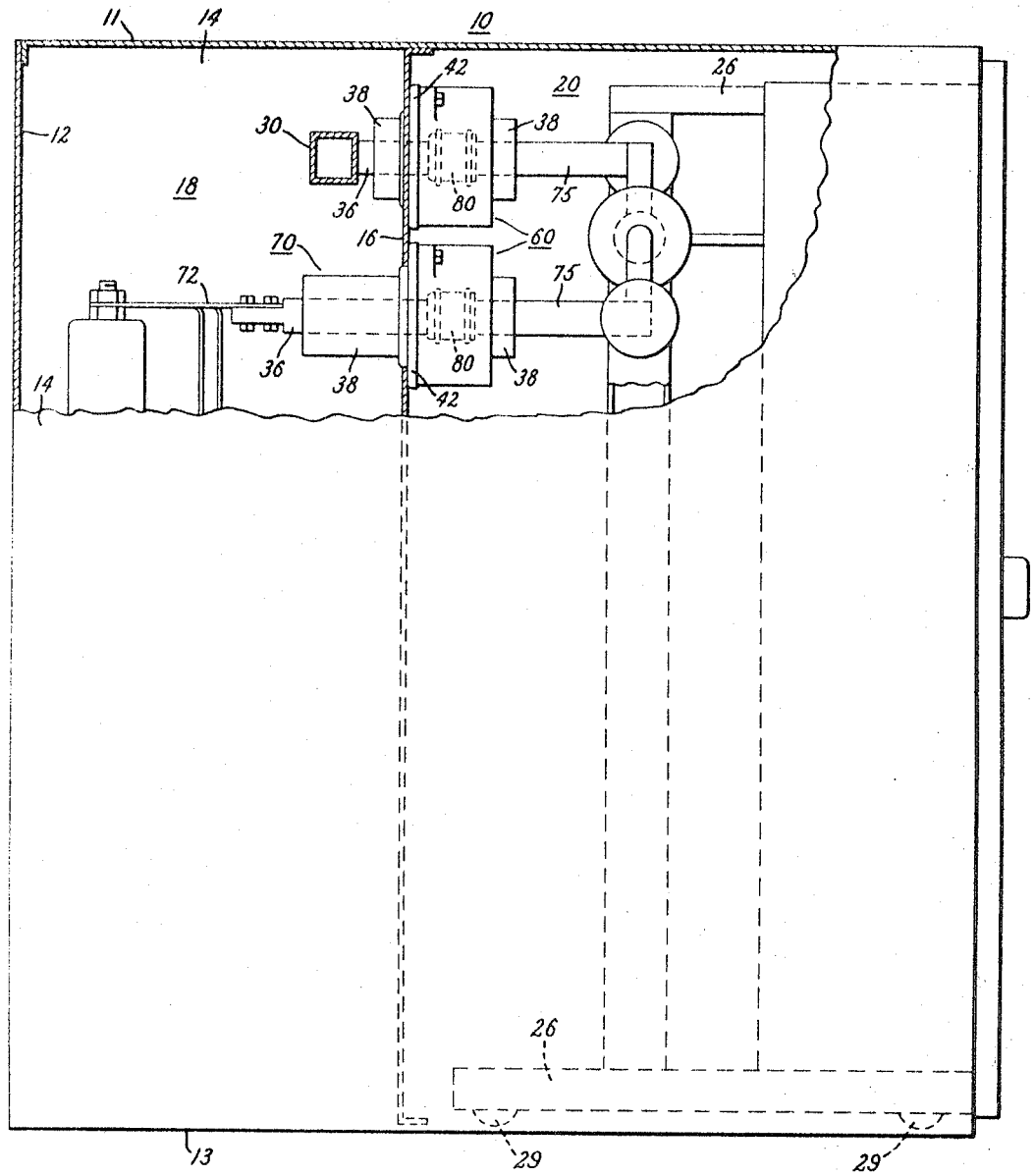
FIG. 1 is a side elevational view, partly in section, of a switchgear unit embodying one form of my invention.

Referring now to FIG. 1, the switchgear unit shown therein comprises a grounded metal cabinet 10 having a top wall 11, a back wall 12, and a bottom wall 13. At each of the laterally opposed sides of the cabinet are sidewalls 14. Extending parallel to the back wall 12 between the sidewalls 14 is a vertically disposed metal partition 16 that is suitably fastened to the sidewalls and is at ground potential. Partition 16 is spaced from the back wall to form a primary conductor compartment 18 between the partition 16 and the back wall 12.

Located in front of partition 16 is a breaker compartment 20. This breaker compartment 20 is adapted to receive a horizontally movable circuit breaker unit 24. In FIG. 1 the movable circuit breaker unit is shown positioned in its connected position inside the breaker compartment 20. The movable circuit breaker unit is shown and claimed in the aforesaid Darrow et al. patent and is not a part of my invention. For a showing of the circuit breaker unit removed from the breaker compartment, reference may be had to FIG. 2 of the Darrow et al. patent. The movable circuit breaker unit comprises a truck 26 mounted on suitable wheels 29. These wheels roll along the bottom wall 13 of the cabinet when the movable circuit breaker unit 24 is being withdrawn from or inserted into its connected position of FIG. 1. More details of the circuit breaker unit will soon be presented.

Returning now to the primary conductor compartment 18, there are three bus bars 30 located in this compartment. These bus bars extend horizontally across the cabinet and are vertically spaced from each other. Only the top bus bar 30 is shown in FIG. 1, inasmuch as the others are substantialy identical. Projecting from the illustrated bus bar is a horizontally extending stud 36 that extends from the bus bar through an opening in the partition 16 to a location in front of the partition.

Figure 2:
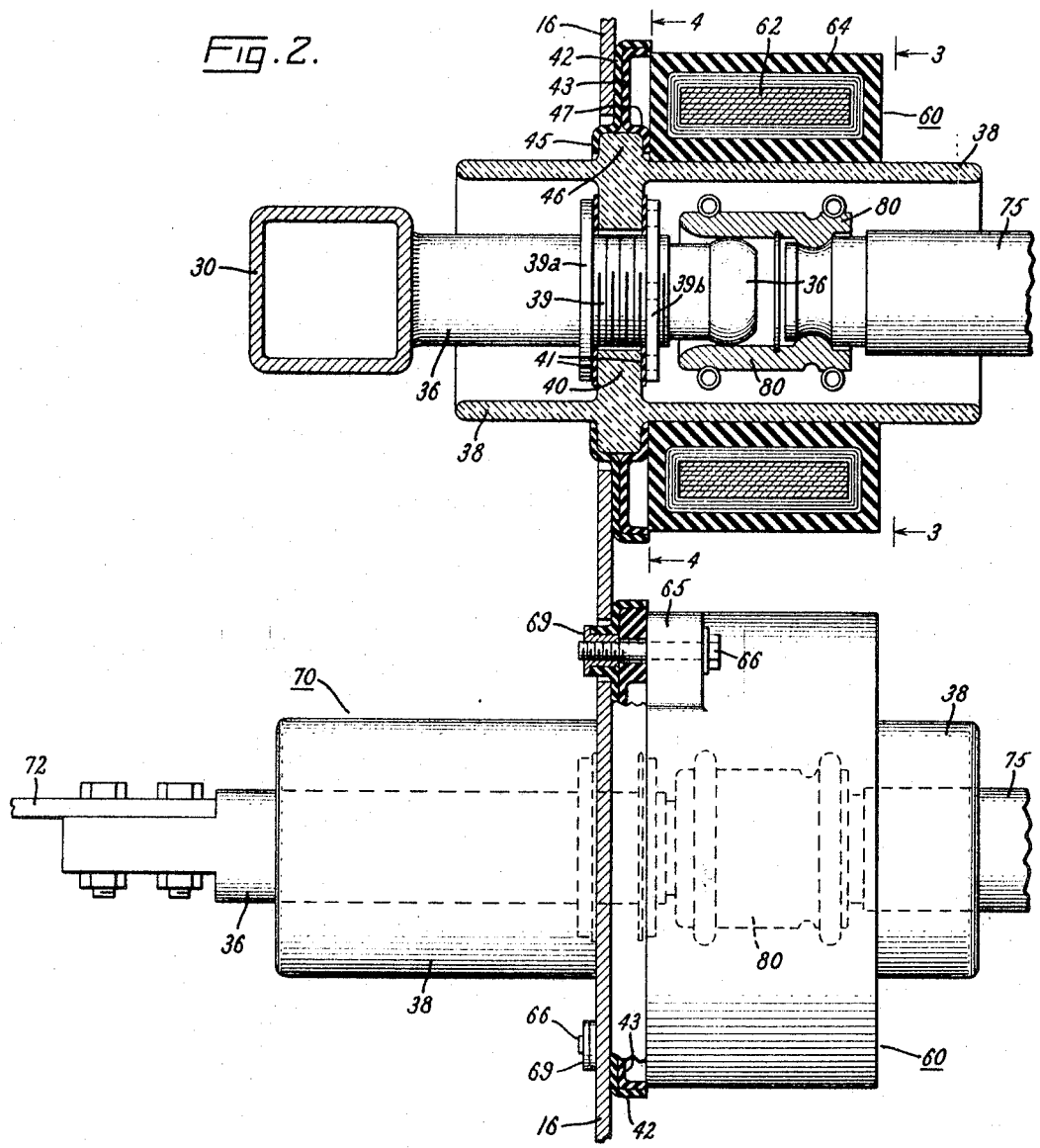
FIG. 2 is an enlarged sectional view of certain components depicted in FIG. 1.

Supporting the bus bar 30 and stud 36 on the partition 16 is a tubular insulator 38 preferably of porcelain. This insulator 38 surrounds stud 36 and is detachably secured thereto by a joint 39 (FIG. 2). This joint comprises an outwardly extending shoulder 39a on stud 36 and a nut 39b threaded on the stud. An inwardly extending annular flange 40 on the tubular insulator 38 is clamped between shoulder 39a and the nut 39b of the stud. Preferably insulating material 41 is positioned between the flange 40 and the parts of joint 39a to protect the flange from damage from the clamping action and to improve the insulating properties in this area.

The hollow porcelain insulator 38 is supported on the metal partition 16 by a pair of support plates 42 and 43 of insulating material, preferably a mechanically strong insulating material of a fiber glass-reinforced resin. These insulating plates 42 and 43 have aligned central openings receiving the tubular insulator 38 and annular recessed portions 45 and 47, each of an L-shaped cross section surrounding their respective central openings. These recessed portions 45 and 47 are aligned and cooperate to form therebetween an annular seat of U-shaped cross-section for receiving an outer flange 46 on the tubular insulator 38.

Figure 4:
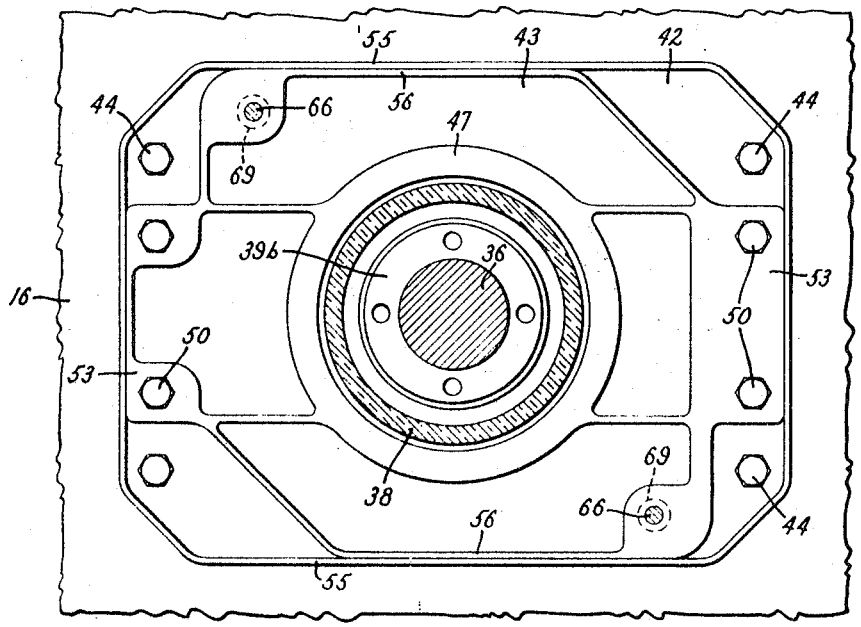
FIG. 4 is a sectional view taken along the line 4—4 of FIG. 2.

The first of these insulating plates 42 is detachably mounted on the front side of partition 16 by means of screws 44 (FIG. 4) extending through the insulating plate 42 and threaded into suitable inserts (not shown) attached to partition 16. The second or outer insulating plate 43 is clamped against the first insulating plate to hold the outer flange 46 of the tubular insulator 38 seated in the annular seat between the recessed portions 45 and 47 of the insulating plates 42 and 43.

For clamping the two insulating plates 42 and 43 together, screws 50 (FIG. 4) are relied upon. The screws 50 extend through holes in the outer plate 43 and are threaded into inserts 52 carried by the inner plate 42. It is to be noted that the screws 50 are located near the outermost edge of plate 43 so as to provide generous electrical clearance between the high voltage stud 36 and the screws 50. To maximize this clearance distance, the outer insulating plate 43 is provided with lugs 53 that extend radially outward nearly to the outer edge of the inner insulating plate 42, and it is these lugs 53 that receive the screws 50.

Both of the insulating plates 42 and 43 have laterally-projecting flanges along their peripheries to impart added mechanical strength thereto. These flanges are shown at 55 and 56 in FIG. 4. As further shown in FIG. 4, insulating plate 43 is thickened in the regions surrounding the bolt holes therein, thus further strengthening it.

Figure 3:
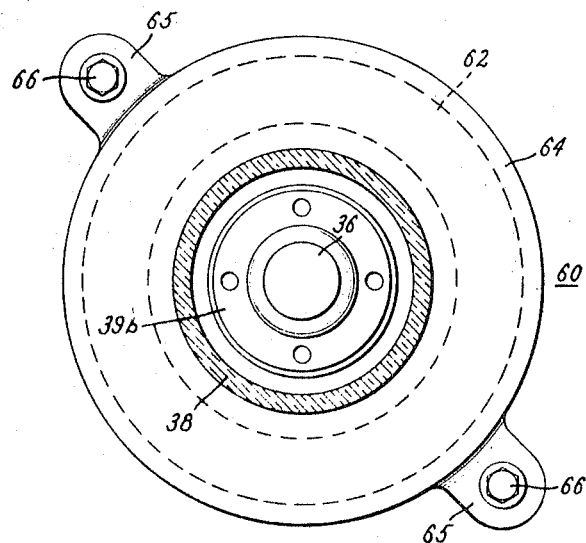
FIG. 3 is a sectional view taken along the line 3—3 of FIG. 2.

Surrounding the tubular insulator on the front side of the partition 16 is a current transformer 60 of a conventional design for sensing the current through stud 36. This current transformer comprises secondary structure 62 and a resin casing 64 encapsulating the secondary structure 62. As shown in FIGS. 2 and 3, the resin casing 64 has a round outer periphery and spaced-apart mounting lugs 65 projecting radially therefrom adjacent partition 16. As shown in connection with the lower current transformer 60 of FIG. 2, bolts 66 extend through these lugs 65 and through plate 43 to clamp the casing 64 to insulating plate 42 and hence to partition 16. Suitable threaded inserts 69 are provided in the insulating plate 42 to receive these bolts 66.

In addition to a plurality of the above-described bus terminal structures, there are line conductor terminal structures 70 also located in the primary conductor compartment 18. One of these line terminal structures is shown in FIG. 1, located beneath the bus terminal structure. The line terminal structure is generally the same as the bus terminal structure except that it is connected, instead of to a bus, to a line conductor such as 72.

The movable circuit breaker unit 24 has rigid conductive studs 75 projecting horizontally therefrom. These studs carry socket-type disconnect contacts 80 at their free ends. When the movable circuit breaker unit is fully inserted into cabinet 10, the socket-type disconnect contacts 80 slide over the free ends of stationary studs 36, thereby connecting the movable circuit breaker unit in the power circuit in a well-known manner. Withdrawal of the circuit breaker unit from cabinet 10 results in separation of the disconnect contacts 80 from the stationary studs 36, thereby disconnecting the circuit breaker from the power circuit.

If, for any reason, it becomes necessary to replace one of the tubular porcelain insulators 38 or the insulator mounting plates 42, 43, it is a simple matter to do this in my switchgear unit without disturbing the position of the bus 30 or the connected stud 36. All the required disassembly steps can be easily carried out from a point in front of the partition 16. It is unnecessary to have access to the primary conductor compartment 18 at the rear of the partition. First, working from a point in front of partition 16, the screws 66 holding the current transformer structure 62, 64 in place are removed, and the current transformer structure is withdrawn (to the right in FIG. 2) from its position around the tubular insulator 38. Next, the screws 50 are removed, thus releasing the outside mounting plate 43, allowing it to be withdrawn to the right in FIG. 2. Then, the nut 39b on stud 36 is unscrewed and removed. This allows the tubular insulator 38 to be withdrawn to the right. After the tubular insulator 38 is thus withdrawn, the screws 44 holding the inside mounting plate 42 in position are removed, and this allows the inside mounting plate to be withdrawn to the right as viewed in FIG. 2. This completes disassembly of the entire mounting structure for stud 36. Any of the removed parts, if damaged, can be replaced with a new part, after which the mounting can be reassembled. Reassembly, as well as disassembly, can be performed entirely from the right hand side, or front, of the partition 16 of FIGS. 1 and 2. During reassembly the parts are incorporated in the mounting in essentially the reverse order from that used for disassembly.

It is to be understood that the bus 30 and stud 36 remain supported in their illustrated position despite the above-described removal of the mounting structure. In this connection, there is typically an adjacent switchgear unit at one or even both sides of the illustrated switchgear unit. These adjacent switchgear units will typically be of the same construction as the illustrated unit, and the primary conductor compartments of all of the side-by-side units will be aligned. In such a lineup of switchgear units, each horizontally extending bus bar 30 extends through the aligned primary conductor compartments of the adjacent switchgear units and will be supported in each switchgear unit by a stud and a stud mounting corresponding to that shown in FIG. 1. These studs and stud mountings in adjacent compartments will hold the bus 30 and the illustrated stud 36 in its position of FIG. 1 despite removal of the illustrated stud mounting.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. An electric switchgear unit comprising:
 (a) a grounded metal cabinet comprising a vertical metal partition extending thereacross,
 (b) a bus bar extending horizontally across said cabinet behind said partition,
 (c) a horizontally extending stud connected to said bus bar and projecting from said bus bar through an opening in said partition to a point in front of said partition,
 (d) a tubular insulator positioned in said opening, surrounding said stud, and detachably secured thereto,
 (e) said tubular insulator comprising a radially outwardly projecting flange on its outer periphery,
 (f) a first plate of insulating material detachably mounted on the front side of said partition and having an opening therein receiving said tubular insulator,
 (g) a second plate of insulating material positioned against the front side of said first plate and having an opening therein receiving said tubular insulator,
 (h) at least one of said plates having a recessed portion surrounding the opening therein and forming at least a portion of an annular seat receiving said flange on said tubular insulator, and
 (i) means for clamping said second plate against said first plate and against the flange on said tubular insulator, thereby holding said flange between said two plates in said annular seat.

2. The switchgear unit of claim 1 in which:
 (a) both of said plates have recessed portions of generally L-shaped cross section surrounding the opening therein, (b) said L-shaped recessed portions being substantially aligned to form said annular seat and to impart a generally U-shaped cross section to said annular seat, (c) said flange on the tubular insulator being seated in said U-shaped seat and clamped between said two plates.

References Cited

UNITED STATES PATENTS

| 2,563,441 | 8/1951 | Wood et al. | 317—103 |
| 3,015,756 | 1/1962 | Kreekon et al. | 317—103 |

LEWIS H. MYERS, Primary Examiner

GERALD P. TOLIN, Assistant Examiner